US008741821B2

(12) United States Patent
Jao et al.

(10) Patent No.: US 8,741,821 B2
(45) Date of Patent: Jun. 3, 2014

(54) NANOPARTICLE ADDITIVES AND LUBRICANT FORMULATIONS CONTAINING THE NANOPARTICLE ADDITIVES

(75) Inventors: Tze-Chi Jao, Glen Allen, VA (US); Mark T. Devlin, Richmond, VA (US); Allen A. Aradi, Glen Allen, VA (US)

(73) Assignee: Afton Chemical Corporation, Richmond, VA (US)

( * ) Notice: Subject to any disclaimer, the term of this patent is extended or adjusted under 35 U.S.C. 154(b) by 1356 days.

(21) Appl. No.: 11/619,470

(22) Filed: Jan. 3, 2007

(65) Prior Publication Data
US 2008/0161213 A1 Jul. 3, 2008

(51) Int. Cl.
*C10M 169/04* (2006.01)

(52) U.S. Cl.
USPC ............ 508/165; 508/154; 423/263; 977/773

(58) Field of Classification Search
USPC ................... 508/165, 154; 423/263; 977/773
See application file for complete search history.

(56) References Cited

U.S. PATENT DOCUMENTS

| | | |
|---|---|---|
| 2,384,577 A | 9/1945 | Thomas |
| 2,710,872 A | 6/1955 | Thompson |
| 2,786,866 A | 3/1957 | Hook et al. |
| 2,897,152 A | 3/1959 | Elliot et al. |
| 3,205,053 A | 9/1965 | McCord |
| 3,219,666 A | 11/1965 | Norman et al. |
| 3,231,592 A | 1/1966 | McCord |
| 3,356,702 A | 12/1967 | Farmer et al. |
| 3,407,222 A | 10/1968 | Lies |
| 3,509,051 A | 4/1970 | Farmer et al. |
| 3,565,804 A | 2/1971 | Honnen et al. |
| 3,697,574 A | 10/1972 | Piasek et al. |
| 3,736,357 A | 5/1973 | Piasek et al. |
| 3,794,081 A | 2/1974 | Fiser et al. |
| 3,867,359 A | 2/1975 | Beadle |
| 4,029,587 A | 6/1977 | Koch |
| 4,098,705 A | 7/1978 | Sakurai et al. |
| 4,164,473 A | 8/1979 | Coupland et al. |

(Continued)

FOREIGN PATENT DOCUMENTS

| | | |
|---|---|---|
| EP | 330522 B1 | 8/1989 |
| EP | 0348384 A2 | 12/1989 |

(Continued)

OTHER PUBLICATIONS

Makhluf, Dror, Nitzan, Abramovich, Jelinek, and Gedanken, "Microwave-Assisted Synthesis of Nanocrystalline MGO and Its Use as a Bacteriocide," Adv. Funct. Mater., vol. 15, 2005, pp. 1708-1715, Wiley-VCH Verlag GmbH, Germany.

(Continued)

*Primary Examiner* — James Goloboy
*Assistant Examiner* — Latosha Hines
(74) *Attorney, Agent, or Firm* — Luedeka Neely Group, P.C.

(57) ABSTRACT

A method for reducing a friction coefficient adjacent a lubricated surface, and a lubricant composition for reducing a friction coefficient between lubricated surfaces. The method includes providing an amount of metal-containing dispersed in a fully formulated lubricant composition containing a base oil of lubricating viscosity, wherein the nanoparticles have an average particles size ranging from about 1 to about 10 nanometers. The lubricant composition containing the metal-containing nanoparticles is applied to a surface to be lubricated.

21 Claims, 3 Drawing Sheets

(56) References Cited

U.S. PATENT DOCUMENTS

| | | |
|---|---|---|
| 4,178,258 A | 12/1979 | Papay et al. |
| 4,234,435 A | 11/1980 | Meinhardt et al. |
| 4,259,195 A | 3/1981 | King et al. |
| 4,261,843 A | 4/1981 | King et al. |
| 4,263,152 A | 4/1981 | King et al. |
| 4,265,773 A | 5/1981 | deVries et al. |
| 4,266,945 A | 5/1981 | Karn |
| 4,272,387 A | 6/1981 | King et al. |
| 4,283,295 A | 8/1981 | deVries et al. |
| 4,285,822 A | 8/1981 | deVries et al. |
| 4,362,633 A | 12/1982 | Spence et al. |
| 4,369,119 A | 1/1983 | deVries et al. |
| 4,395,343 A | 7/1983 | deVries et al. |
| 4,402,840 A | 9/1983 | deVries et al. |
| 4,466,901 A | 8/1984 | Hunt et al. |
| 4,636,322 A | 1/1987 | Nalesnik |
| 4,692,256 A | 9/1987 | Umemura et al. |
| 4,758,362 A | 7/1988 | Butke |
| 4,765,918 A | 8/1988 | Love et al. |
| 4,876,375 A | 10/1989 | Lam |
| 4,885,365 A | 12/1989 | Lam |
| 4,889,647 A | 12/1989 | Rowan et al. |
| 4,904,401 A | 2/1990 | Ripple et al. |
| 4,927,552 A | 5/1990 | Lam |
| 4,957,643 A | 9/1990 | Lam |
| 4,957,649 A | 9/1990 | Ripple et al. |
| 4,966,719 A | 10/1990 | Coyle et al. |
| 4,978,464 A | 12/1990 | Coyle et al. |
| 4,990,271 A | 2/1991 | Francis |
| 4,995,996 A | 2/1991 | Coyle et al. |
| 5,137,647 A | 8/1992 | Karol |
| 5,204,012 A | 4/1993 | Schaffhausen |
| 5,412,130 A | 5/1995 | Karol |
| 5,449,387 A | 9/1995 | Hawkins et al. |
| 5,627,259 A | 5/1997 | Thaler et al. |
| 5,633,326 A | 5/1997 | Patil et al. |
| 5,643,859 A | 7/1997 | Gutierrez et al. |
| 5,686,397 A | 11/1997 | Baranski et al. |
| 5,693,598 A | 12/1997 | Abraham et al. |
| 5,789,357 A | 8/1998 | Baranski et al. |
| 5,792,729 A | 8/1998 | Harrison et al. |
| 5,851,965 A | 12/1998 | Harrison et al. |
| 5,853,434 A | 12/1998 | Harrison et al. |
| 5,902,776 A | 5/1999 | Dohner et al. |
| 5,936,041 A | 8/1999 | Diana et al. |
| 6,034,040 A | 3/2000 | Ozbalik et al. |
| 6,093,223 A | 7/2000 | Lemaire et al. |
| 6,103,674 A | 8/2000 | Nalesnik et al. |
| 6,114,288 A | 9/2000 | Fujitsu et al. |
| 6,117,826 A | 9/2000 | Baranski et al. |
| 6,232,276 B1 | 5/2001 | Stiefel et al. |
| 6,509,303 B1 | 1/2003 | Gatto |
| 6,528,463 B1 | 3/2003 | Gatto et al. |
| 6,599,865 B1 | 7/2003 | Esche, Jr. et al. |
| 6,752,979 B1 | 6/2004 | Talbot et al. |
| 6,797,677 B2 | 9/2004 | Esche, Jr. et al. |
| 7,527,773 B2 | 5/2009 | Cao |
| 2003/0154646 A1 | 8/2003 | Hazarika et al. |
| 2004/0266630 A1 | 12/2004 | George et al. |
| 2005/0066571 A1 | 3/2005 | Wakefield |
| 2005/0124504 A1 | 6/2005 | Zhang et al. |
| 2006/0005465 A1 | 1/2006 | Blanchard et al. |
| 2006/0027484 A1 | 2/2006 | Leck et al. |
| 2006/0094605 A1 | 5/2006 | Bakunin et al. |
| 2006/0217271 A1 | 9/2006 | Brown et al. |
| 2006/0241008 A1 | 10/2006 | Baker et al. |
| 2006/0254130 A1 | 11/2006 | Scattergood |
| 2007/0004602 A1 | 1/2007 | Waynick |
| 2007/0140951 A1 | 6/2007 | O'Brien et al. |
| 2008/0164141 A1 | 7/2008 | El-Shall et al. |
| 2008/0175779 A1 | 7/2008 | Cao |
| 2009/0018037 A1 | 1/2009 | Mabuchi et al. |
| 2009/0048129 A1 | 2/2009 | Mabuchi et al. |

FOREIGN PATENT DOCUMENTS

| | | |
|---|---|---|
| EP | 1980609 A1 | 7/2006 |
| JP | 07-070576 A | 3/1995 |
| JP | 07-118683 A | 5/1995 |
| JP | 2000-226591 A | 8/2000 |
| JP | 2001-172658 A | 6/2001 |
| JP | 2005-213290 A | 8/2005 |
| RU | 2114903 | 7/1998 |
| WO | 9404638 A1 | 3/1994 |
| WO | 9744414 A1 | 11/1997 |
| WO | 9900326 A1 | 1/1999 |
| WO | 03040270 A2 | 5/2003 |
| WO | 2005012465 A1 | 2/2005 |
| WO | WO 2005/012465 * | 2/2005 |
| WO | WO 2006133347 * | 12/2006 |
| WO | 2007085561 A1 | 8/2007 |

OTHER PUBLICATIONS

Tompsett, Conner, and Yngvesson, "Microwave Synthesis of Nanoporous Materials," Chem. Phys. Chem, vol. 7, 2006, pp. 296-319, Wiley-VCH Verlag GmbH & Co. Germany.

Gao et al., "Fast Synthesis of Cerium Oxide Nanoparticles and Nanorods", Journal of Nanoscience and Nanotechnology, Dec. 2006, vol. 6, issue 12, pp. 3812-3819, American Scientific Publishers, USA.

* cited by examiner

1

NANOPARTICLE ADDITIVES AND LUBRICANT FORMULATIONS CONTAINING THE NANOPARTICLE ADDITIVES

TECHNICAL FIELD

The embodiments described herein relate to methods for friction modification and wear reduction using fully formulated lubricants containing nanoparticles. In particular, oil-soluble nanospherical components are used in lubricant formulations to reduce friction coefficients thereof and as wear reducing agents therefor.

BACKGROUND AND SUMMARY

A lubricant may be a liquid, a paste, or a solid with liquid lubricants being the most used. Lubricating oils may be used in automobile engines, transmissions, bearings, gears, industrial gears and other machinery to reduce friction and wear and to increase fuel economy. A number of components including, but not limited to dispersants, detergents, friction modifiers, antiwear agents, antioxidants, and anti-corrosion additives are typically present in fully formulated lubricating oils. For many lubricant applications, a viscosity index improver may also be included as a major component.

With the energy resources depleting and more stringent environmental regulations being adopted, there exists a greater demand to increase a fuel economy of vehicles and to decrease emissions in vehicle exhausts. Currently, organic friction modifiers are added to the lubricating oils to increase fuel economy. However, the level of the fuel economy achievable by organic friction modifiers is limited. Hence, there is a need for alternate methods for achieving improvements in fuel economy.

One method for increasing fuel economy is to provide lower viscosity grade lubricating oils. While providing lower viscosity lubricating oils may dramatically increase fuel economy, such lubricating oils may also increase wear. Wear may be partially reduced by using antiwear agents such as zinc dialkyldithiolphosphate (ZDTP). However, ZDDP contains phosphorus and its decomposition products may have deleterious effects on automotive catalyst systems for emission control. Accordingly, there remains an increasing need for methods for reducing friction and wear without adversely affecting emission control systems and without further depleting scarce natural resources.

With regard to the above, exemplary embodiments described herein provide methods for reducing friction coefficients and wear between lubricated surfaces. The method includes providing an amount of metal-containing nanoparticles dispersed in a fully formulated lubricant composition containing a base oil of lubricating viscosity. The nanoparticles have a formula of $(A_a)_m(B_b)_nX_x$, wherein each of A, B is selected from a metal, X is selected from the group consisting of oxygen and sulfur, subscripts a, b, and x represent compositional stoichiometry, and each of m and n is greater than or equal to zero with the proviso that at least one of m and n is greater than zero, wherein the nanoparticles have an average particles size ranging from about 1 to about 10 nanometers. The lubricant composition containing the metal-containing nanoparticles is applied to a surface to be lubricated.

In another embodiment, there is provided a method of reducing a friction coefficient of an engine lubricant composition during operation of an engine containing the lubricant composition. The method includes contacting the engine parts with a fully formulated lubricant composition that contains a base oil of lubricating viscosity and an amount of metal-containing nanoparticles sufficient to reduce the friction coefficient to below a friction coefficient of a lubricant composition devoid of the metal-containing nanoparticles. The nanoparticles have a formula of $(A_a)_m(B_b)_nX_x$, wherein each of A, B is selected from a metal, X is selected from the group consisting of oxygen and sulfur, subscripts a, b, and x represent compositional stoichiometry, and each of m and n is greater than or equal to zero with the proviso that at least one of m and n is greater than zero. The nanoparticles in the lubricant composition have an average particle size ranging from about 1 to about 10 nanometers.

A further embodiment of the disclosure provides a method for reducing wear between moving parts using a lubricating oil. The method includes using as the lubricating oil for one or more moving parts a lubricant composition containing a base oil, and an oil additive package including a wear reducing agent. The wear reducing agent is made of dispersed metal-containing nanoparticles, wherein the amount of nanoparticles in the lubricant composition ranges up to about 5 percent by weight of the total lubricant composition. The metal-containing nanoparticles have a formula of $(A_a)_m(B_b)_nX_x$, wherein each of A, B is selected from a metal, X is selected from the group consisting of oxygen and sulfur, subscripts a, b, and x represent compositional stoichiometry, and each of m and n is greater than or equal to zero with the proviso that at least one of m and n is greater than zero.

Another embodiment of the disclosure provides a lubricant composition containing a base oil of lubricating viscosity and a boundary friction reducing amount of metal-containing nanoparticles dspersed in the base oil. The metal-containing nanoparticles have a formula of $(A_a)_m(B_b)_nX_x$, wherein each of A, B is selected from a metal, X is selected from the group consisting of oxygen and sulfur, subscripts a, b, and x represent compositional stoichiometry, and each of m and n is greater than or equal to zero with the proviso that at least one of m and n is greater than zero. The nanoparticles have an average particles size ranging from about 1 to about 10 nanometers, and are effective to reduce a boundary friction coefficient between lubricated metal surfaces to below a boundary friction coefficient between the lubricated metal surfaces of a lubricant composition devoid of the metal-containing nanoparticles.

Yet another embodiment of the disclosure provides oil dispersible cerium oxide nanoparticles derived from a cerium acetate solution of amine and organic acid. The cerium acetate solution is irradiated by a high frequency electromagnetic radiation source to provide oil dispersible nanoparticles having a substantially uniform particle size ranging from about 1 to about 10 nanometers.

As set forth briefly above, embodiments of the disclosure provide unique finished lubricant compositions that may significantly improve the coefficient of friction of the lubricant composition and may reduce wear for relatively low viscosity lubricant compositions. An additive package containing the metal-containing nanoparticales may be mixed with an oleaginous fluid that is applied to a surface between moving parts. In other applications, an additive package containing the metal-containing nanoparticles may be provided in a fully formulated lubricant composition.

The methods and compositions described herein may also be suitable for reducing emissions of CO and hydrocarbons (HC) from engines lubricated with the lubricant compositions described herein. It is well known that certain metals may be useful for improving the burning efficiency of fuels. For example, metal-containing nanoparticles from the lubricants may enter the combustion chamber by leaking around the piston rings thereby providing a catalytic source suitable for improving fuel combustion without directly adding metal compounds to the fuel. Other features and advantages of the methods described herein may be evident by reference to the following detailed description which is intended to exemplify aspects of the exemplary embodiments without intending to limit the embodiments described herein.

It is to be understood that both the foregoing general description and the following detailed description are exemplary and explanatory only and are intended to provide further explanation of the embodiments disclosed and claimed. The phrases "having the formula" or "have the formula" are intended to be non-limiting with respect to nanoparticles or nanoalloy particles described herein. The formula is given for the purposes of simplification and is intended to represent mono-, di-, tri-, tetra-, and polymetallic nanoparticles.

DETAILED DESCRIPTION OF EMBODIMENTS

Figure 1:
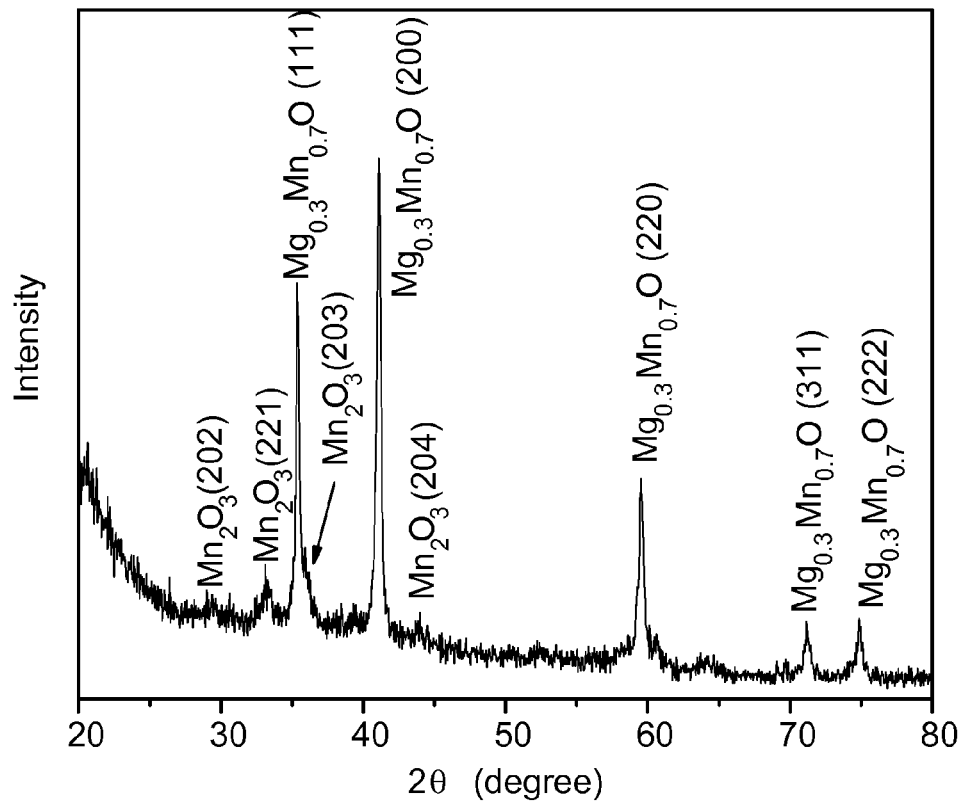
FIG. 1 is an x-ray diffraction pattern of nanoalloy particles according to a first embodiment of the disclosure.

For the purposes of this disclosure, the terms "hydrocarbon soluble," "oil soluble," or "dispersable" are not intended to indicate that the compounds are soluble, dissolvable, miscible, or capable of being suspended in a hydrocarbon compound or oil in all proportions. These do mean, however, that they are, for instance, soluble or stably dispersible in oil to an extent sufficient to exert their intended effect in the environment in which the oil is employed. Moreover, the additional incorporation of other additives may also permit incorporation of higher levels of a particular additive, if desired. The terms "self-dispersing" or "self-dispersible" mean the particles may be dispersed in a hydrocarbon material without the use of additional dispersing agents.

As used herein, "hydrocarbon" means any of a vast number of compounds containing carbon, hydrogen, and/or oxygen in various combinations. The term "hydrocarbyl" refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of the description herein, do not alter the predominantly hydrocarbon substituent (e.g., halo (especially chloro and fluoro), hydroxy, alkoxy, mercapto, alkylmercapto, nitro, nitroso, and sulfoxy);

(3) hetero-substituents, that is, substituents which, while having a predominantly hydrocarbon character, in the context of this description, contain other than carbon in a ring or chain otherwise composed of carbon atoms. Hetero-atoms include sulfur, oxygen, nitrogen, and encompass substituents such as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

The metal-containing nanoparticles described herein have a substantially uniform size and shape, and may be represented by the formula $(A_a)_m(B_b)_nX_x$, wherein each of A and B is selected from a metal, X is selected from the group consisting of oxygen and sulfur, subscripts a, b, and x represent compositional stoichiometry, and each of m and n is greater than or equal to zero with the proviso that at least one of m and n is greater than zero. The metal nanoparticles described herein are not limited to one or two metal sulfides or oxides, but may include additional metals as alloying or doping agents in the formula.

In the foregoing formula, A and B of the metal-containing nanoparticles may be selected from Groups 1A, 2A, 3A, 4A, 5A, and 6A of the Periodic Table, transition metals, lanthanides, actinides, and mixtures thereof. Representative metals include, but are not limited to, titanium, zirconium, hafnium, thorium, germanium, tin, niobium, tantalum, molybdenum, tungsten, uranium, cerium, the rare earth metals, copper, beryllium, zinc, cadmium, mercury, aluminum, yttrium, gallium, indium, lanthanum, manganese, iron, cobalt, nickel, calcium, magnesium, strontium, and barium.

The metal-containing nanoparticles described herein may be uniformly spherical, plate-like, or rod-like and will typically have a substantially uniform particle size of less than 50 nanometers. For example, the nanoparticles may have a uniform size ranging from about 1 to about 30 nanometers. Other uniform particle sizes may range from about 2 to about 10 nanometers. Still other uniform particle sizes may range from about 3 to about 6 nanometers.

According to the exemplary embodiments described herein, the metal-containing nanoparticles may be made by a relatively simple process. The process is primarily a two step process that includes combining one or more metal organic compounds with a hydrocarbyl component to provide a solution of metal organic compound in the hydrocarbyl component. The solution of metal organic compound is then irradiated by a high frequency electromagnetic radiation source to provide stabilized metal-containing nanoparticles. In some embodiments, the nanoparticles are self-dispersing nanoparticles.

In the first step of the process, one or more metal-organic compounds are dissolved in a hydrocarbyl component that is compatible with oils and hydrocarbon solvents. A suitable hydrocarbyl component is an amine or a mixture of amine and organic acid. The amine may be a saturated or unsaturated hydrocarbyl amine having from about 3 to about 24 carbon atoms. Suitable hydrocarbyl amines include, but are not limited to amines of the formula $RNH_2$ in which R is an unsaturated hydrocarbyl radical having from 3 to 24 carbon atoms. A suitable range for R is from 10 to 20 carbon atoms. R may be an aliphatic or a cycloaliphatic, saturated or unsaturated hydrocarbon radical. Typical unsaturated hydrocarbyl amines which can be employed include hexadecylamine, oleylamine, allylamine, furfurylamine, and the like.

When used, the organic acid may be selected from unsaturated fatty acids containing from about 10 to about 26 carbon atoms. Suitable organic acids include, but are not limited to, oleic acid, erucic acid, palmitoleic acid, myristoleic acid, linoleic acid, linolenic acid, elaeosteric acid, arachidonic acid and/or ricinoleic acid. Fatty acid mixtures and fractions obtained from natural fats and oils, for example peanut oil fatty acid, fish oil fatty acid, linseed oil fatty acid, palm oil fatty acid, rapeseed oil fatty acid, ricinoleic oil fatty acid, castor oil fatty acid, colza oil fatty acid, soya oil fatty acid, sunflower oil fatty acid, safflower oil fatty acid and tall oil fatty acid, may also be used.

The metal organic compound solution may contain a molar ratio of amine to organic acid ranging from about 1:1 to about 3:1 amine to acid. Likewise, the solution may contain a molar ratio of amine to metal organic compound ranging from about 5:1 to about 10:1.

After forming the solution of metal organic compound in the hydrocarbyl component, the solution may be heated for a period of time at elevated temperature to remove any water of crystallization and/or to form a clear solution. Accordingly, the solution may be heated and held at a temperature ranging from about 50° to about 150° C. for a period of time ranging from about 1 minute to about 50 minutes depending on the scale of the reaction mixture. A large volume of metal organic compound solution may require a longer heating time, while a smaller volume may require a shorter heating time.

Upon heating the solution, a substantially clear solution of metal organic compound in the hydrocarbyl component is obtained. The clear solution is then irradiated for a period of time using a high frequency electromagnetic radiation source to provide stabilized metal-containing nanoparticles in the hydrocarbyl component. A suitable high frequency electromagnetic radiation source is a microwave radiation source providing electromagnetic radiation with wavelengths ranging from about 1 millimeter to about 1 meter corresponding to frequencies from about 300 GHz to about 300 MHz, respectively. A more suitable frequency range for the electromagnetic radiation ranges from about 0.4 GHz to about 40 GHz. A particularly suitable frequency range is from about 0.7 GHz to about 24 GHz. The irradiation step may be conducted for a period of time ranging from about 10 seconds to about 50 minutes depending on the volume of reactants present in the reaction mixture.

Without being bound by theoretical considerations, it is believed that irradiation of the solution rapidly decomposes the metal-organic compound to produce metal ions which are then coordinated with the hydrocarbyl component to form uniformly dispersed metal-containing nanoparticles that are stabilized or coated by the hydrocarbyl component. It is also believed that the use of microwave radiation leads to selective dielectric heating due to differences in the solvent and reactant dielectric constants that provides enhanced reaction rates. Thus formation of metal-containing nanoparticles by the foregoing process is extremely rapid enabling large scale production of nanoparticles in a short period of time. Since microwave radiation is used, thermal gradients in the reaction mixture are minimized thereby producing a generally uniform heating effect and reducing the complexity required for scale-up to commercial quantities of nanoparticle products.

Microwave heating is able to heat the target compounds without heating the entire reaction container or oil bath, thereby saving time and energy. Excitation with microwave radiation results in the molecules aligning their dipoles within the external electrical field. Strong agitation, provided by the reorientation of molecules, in phase with electrical field excitation, causes an intense internal heating.

After the irradiation step, the stabilized dispersion may be washed with an alcohol to remove any free acid or amine remaining in the stabilized dispersion of nanoparticles. Alcohols that may be used to wash the stabilized metal-containing nanoparticles may be selected from $C_1$ to $C_4$ alcohols. A particularly suitable alcohol is ethanol.

The size and shape of metal-containing nanoparticles produced by the foregoing process depends on the amount of hydrocarbyl component, and heating time used to provide dispersible metal-containing nanoparticles.

The particle size of the metal-containing nanoparticles may be determined by examining a sample of the particles using TEM (transmission electron microscopy), visually evaluating the grain size and calculating an average grain size therefrom. The particles may have varying particle size due to the very fine grains aggregating or cohering together. However, the particles produced by the foregoing process are typically crystalline nanoparticles having a uniform particle size that is substantially in the range of from 1 to 10 nanometers.

In one exemplary embodiment, cerium oxide nanoparticles having spherical or plate-like shapes and an average size ranging from about 1 to about 10 nanometers may be made. The nanoparticles may be dispersed in a base oil by reacting cerium acetate and/or zinc acetylacetonate with a fatty acid and a fatty acid amine with heat to provide nanoparticle sized cerium oxide crystals that are dispersible in a hydrocarbons solvent. In order to form the cerium oxide nanoparticles, a reaction mixture of cerium acetate, fatty acid and fatty acid amine are heated to a temperature in the range of from about 100° to about 120° C. for about 10 minutes to provide a clear solution devoid of water. Next the solution is microwaved for about 10 to about 15 minutes to provide a stabilized mixture of cerium oxide nanoparticles, fatty acid amine and fatty acid. The stabilized mixture may be washed with alcohol to remove any free amine and dried in a vacuum to provide dispersible nanoparticles of cerium oxide.

In another embodiment, the metal-containing nanoparticles contain a sufficient amount of coating material to provide solubility of the particles in a hydrocarbon solvent. The coating material is believed to be bound or otherwise associated with the surface of the metal-containing nanoparticles such that it takes a significant amount of energy to decompose the nanoparticles. The amount of coating material on the nanoparticles may range from about 5 to about 20 percent by weight of the total weight of the nanoparticles made by the above described process as determined by thermogravimetric analysis techniques.

The metal-containing nanoparticles described above are advantageously incorporated into fuels and lubricating compositions. Accordingly, the metal-containing nanoparticles may be added directly to a finished fuel or lubricating oil composition. In one embodiment, however, the metal-containing nanoparticles are diluted with a substantially inert, normally liquid organic diluent such as mineral oil, synthetic oil (e.g., ester of dicarboxylic acid), naptha, alkylated (e.g., $C_{10}$-$C_{13}$ alkyl) benzene, toluene or xylene to form an additive concentrate. The additive concentrates may contain from about 0% to about 99% by weight diluent oil and the metal-containing nanoparticles.

In the preparation of lubricating oil formulations it is common practice to introduce the additive concentrate in the form of 1 to 99 wt. % active ingredient concentrates in hydrocarbon oil, e.g. mineral lubricating oil, or other suitable solvent. Usually these concentrates may be added to a lubricating oil with a dispersant/inhibitor (DI) additive package and viscosity index (VI) improvers containing 0.01 to 50 parts by weight of lubricating oil per part by weight of the DI package to form finished lubricants, e.g. crankcase motor oils. Suitable DI packages are described for example in U.S. Pat. Nos. 5,204,012 and 6,034,040 for example. Among the types of additives included in the DI additive package are detergents, dispersants, antiwear agents, friction modifiers, seal swell agents, antioxidants, foam inhibitors, lubricity agents, rust inhibitors, corrosion inhibitors, demulsifiers, viscosity index improvers, and the like. Several of these components are well known to those skilled in the art and are used in conventional amounts with the additives and compositions described herein.

Lubricant compositions made with the metal-containing nanoparticles described above are used in a wide variety of applications. For compression ignition engines and spark ignition engines, it is preferred that the lubricant compositions meet or exceed published API-CI-4 or GF-4 standards. Lubricant compositions according to the foregoing API-CI-4 or GF-4 standards include a base oil, the DI additive package, and/or a VI improver to provide a fully formulated lubricant. The base oil for lubricants according to the disclosure is an oil of lubricating viscosity selected from natural lubricating oils, synthetic lubricating oils and mixtures thereof. Such base oils include those conventionally employed as crankcase lubricating oils for spark-ignited and compression-ignited internal combustion engines, such as automobile and truck engines, marine and railroad diesel engines, and the like.

The metal-containing nanoparticles described above may be used in fully formulated automatic transmission fluids, fully formulated crankcase fluids, fully formulated heavy duty gear fluids, and the like. Such nanoparticles may be effective to reduce friction coefficient and wear.

The nanoparticles may be present in an amount of up to about 5 wt % in a fully formulated lubricant composition. As another example, the nanoparticles may be present in an amount of about 0.1 to about 5 wt % in a fully formulated lubricant composition. As an even further example, the nanoparticles may be present in an amount of about 0.5 to about 2 wt % in a fully formulated lubricant composition.

Dispersant Components

Dispersants contained in the DI package include, but are not limited to, an oil soluble polymeric hydrocarbon backbone having functional groups that are capable of associating with metal-containing nanoparticles to be dispersed. Typically, the dispersants comprise amine, alcohol, amide, or ester polar moieties attached to the polymer backbone often via a bridging group. Dispersants may be selected from Mannich dispersants as described in U.S. Pat. Nos. 3,697,574 and 3,736,357; ashless succcinimide dispersants as described in U.S. Pat. Nos. 4,234,435 and 4,636,322; amine dispersants as described in U.S. Pat. Nos. 3,219,666, 3,565,804, and 5,633,326; Koch dispersants as described in U.S. Pat. Nos. 5,936,041, 5,643,859, and 5,627,259, and polyalkylene succinimide dispersants as described in U.S. Pat. Nos. 5,851,965; 5,853,434; and 5,792,729.

Oxidation Inhibitor Components

Oxidation inhibitors or antioxidants reduce the tendency of base stocks to deteriorate in service which deterioration can be evidenced by the products of oxidation such as sludge and varnish-like deposits that deposit on metal surfaces and by viscosity growth of the finished lubricant. Such oxidation inhibitors include hindered phenols, sulfurized hindered phenols, alkaline earth metal salts of alkylphenolthioesters having $C_5$ to $C_{12}$ alkyl side chains, sulfurized alkylphenols, metal salts of either sulfurized or nonsulfurized alkylphenols, for example calcium nonylphenol sulfide, ashless oil soluble phenates and sulfurized phenates, phosphosulfurized or sulfurized hydrocarbons, phosphorus esters, metal thiocarbamates, and oil soluble copper compounds as described in U.S. Pat. No. 4,867,890.

Other antioxidants that may be used include sterically hindered phenols and diarylamines, alkylated phenothiazines, sulfurized compounds, and ashless dialkyldithiocarbamates. Non-limiting examples of sterically hindered phenols include, but are not limited to, 2,6-di-tertiary butylphenol, 2,6 di-tertiary butyl methylphenol, 4-ethyl-2,6-di-tertiary butylphenol, 4-propyl-2,6-di-tertiary butylphenol, 4-butyl-2,6-di-tertiary butylphenol, 4-pentyl-2,6-di-tertiary butylphenol, 4-hexyl-2,6-di-tertiary butylphenol, 4-heptyl-2,6-di-tertiary butylphenol, 4-(2-ethylhexyl)-2,6-di-tertiary butylphenol, 4-octyl-2,6-di-tertiary butylphenol, 4-nonyl-2,6-di-tertiary butylphenol, 4-decyl-2,6-di-tertiary butylphenol, 4-undecyl-2,6-di-tertiary butylphenol, 4-dodecyl-2,6-di-tertiary butylphenol, methylene bridged sterically hindered phenols including but not limited to 4,4-methylenebis(6-tert-butyl-o-cresol), 4,4-methylenebis(2-tert-amyl-o-cresol), 2,2-methylenebis(4-methyl-6 tert-butylphenol, 4,4-methylenebis(2,6-di-tert-butylphenol) and mixtures thereof as described in U.S Publication No. 2004/0266630.

Diarylamine antioxidants include, but are not limited to diarylamines having the formula:

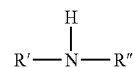

wherein R' and R" each independently represents a substituted or unsubstituted aryl group having from 6 to 30 carbon atoms. Illustrative of substituents for the aryl group include aliphatic hydrocarbon groups such as alkyl having from 1 to 30 carbon atoms, hydroxy groups, halogen radicals, carboxylic acid or ester groups, or nitro groups.

The aryl group is preferably substituted or unsubstituted phenyl or naphthyl, particularly wherein one or both of the aryl groups are substituted with at least one alkyl having from 4 to 30 carbon atoms, preferably from 4 to 18 carbon atoms, most preferably from 4 to 9 carbon atoms. It is desirable that one or both aryl groups be substituted, e.g. mono-alkylated diphenylamine, di-alkylated diphenylamine, or mixtures of mono- and di-alkylated diphenylamines.

The diarylamines may be of a structure containing more than one nitrogen atom in the molecule. Thus the diarylamine may contain at least two nitrogen atoms wherein at least one nitrogen atom has two aryl groups attached thereto, e.g. as in the case of various diamines having a secondary nitrogen atom as well as two aryls on one of the nitrogen atoms.

Examples of diarylamines that may be used include, but are not limited to: diphenylamine; various alkylated diphenylamines; 3-hydroxydiphenylamine; N-phenyl-1,2-phenylenediamine; N-phenyl-1,4-phenylenediamine; monobutyldiphenyl-amine; dibutyldiphenylamine; monooctyldiphenylamine; dioctyldiphenylamine; mononoylndiphenylamine; dinonyldiphenylamine; monotetradecyldiphenylamine; ditetradecyldiphenylamine, phenyl-alpha-naphthylamine; monooctyl phenyl-alpha-naphthylamine; phenyl-beta-naphthylamine; monoheptyldiphenylamine; diheptyl-diphenylamine; p-oriented styrenated diphenylamine; mixed butyloctyldiphenylamine; and mixed octylstyryldiphenylamine.

Another class of aminic antioxidants includes phenothiazine or alkylated phenothiazine having the chemical formula:

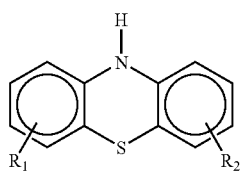

wherein $R_1$ is a linear or branched $C_1$ to $C_{24}$ alkyl, aryl, heteroalkyl or alkylaryl group and $R_2$ is hydrogen or a linear or branched $C_1$-$C_{24}$ alkyl, heteroalkyl, or alkylaryl group. Alkylated phenothiazine may be selected from the group consisting of monotetradecylphenothiazine, ditetradecylphenothiazine, monodecylphenothiazine, didecylphenothiazine, monononylphenothiazine, dinonylphenothiazine, monoctylphenothiazine, dioctylphenothiazine, monobutylphenothiazine, dibutylphenothiazine, monostyrylphenothiazine, distyrylphenothiazine, butyloctylphenothiazine, and styryloctylphenothiazine.

The sulfur containing antioxidants include, but are not limited to, sulfurized olefins that are characterized by the type of olefin used in their production and the final sulfur content of the antioxidant. High molecular weight olefins, i.e. those olefins having an average molecular weight of 168 to 351 g/mole, are preferred. Examples of olefins that may be used include alpha-olefins, isomerized alpha-olefins, branched olefins, cyclic olefins, and combinations of these.

Alpha-olefins include, but are not limited to, any $C_4$ to $C_{25}$ alpha-olefins. Alpha-olefins may be isomerized before the sulfurization reaction or during the sulfurization reaction. Structural and/or conformational isomers of the alpha olefin that contain internal double bonds and/or branching may also be used. For example, isobutylene is a branched olefin counterpart of the alpha-olefin 1-butene.

Sulfur sources that may be used in the sulfurization reaction of olefins include: elemental sulfur, sulfur monochloride, sulfur dichloride, sodium sulfide, sodium polysulfide, and mixtures of these added together or at different stages of the sulfurization process.

Unsaturated oils, because of their unsaturation, may also be sulfurized and used as an antioxidant. Examples of oils or fats that may be used include corn oil, canola oil, cottonseed oil, grapeseed oil, olive oil, palm oil, peanut oil, coconut oil, rapeseed oil, safflower seed oil, sesame seed oil, soyabean oil, sunflower seed oil, tallow, and combinations of these.

The amount of sulfurized olefin or sulfurized fatty oil delivered to the finished lubricant is based on the sulfur content of the sulfurized olefin or fatty oil and the desired level of sulfur to be delivered to the finished lubricant. For example, a sulfurized fatty oil or olefin containing 20 weight % sulfur, when added to the finished lubricant at a 1.0 weight % treat level, will deliver 2000 ppm of sulfur to the finished lubricant. A sulfurized fatty oil or olefin containing 10 weight % sulfur, when added to the finished lubricant at a 1.0 weight % treat level, will deliver 1000 ppm sulfur to the finished lubricant. It is desirable to add the sulfurized olefin or sulfurized fatty oil to deliver between 200 ppm and 2000 ppm sulfur to the finished lubricant. The foregoing aminic, phenothiazine, and sulfur containing antioxidants are described for example in U.S. Pat. No. 6,599,865.

The ashless dialkyldithiocarbamates which may be used as antioxidant additives include compounds that are soluble or dispersable in the additive package. It is also desired that the ashless dialkyldithiocarbamate be of low volatility, with a molecular weight greater than 250 daltons, desirably, a molecular weight greater than 400 daltons. Examples of ashless dithiocarbamates that may be used include, but are not limited to, methylenebis(dialkyldithiocarbamate), ethylenebis(dialkyldithiocarbamate), isobutyl disulfide-2,2'-bis (dialkyldithiocarbamate), hydroxyalkyl substituted dialkyldithio-carbamates, dithiocarbamates prepared from unsaturated compounds, dithiocarbamates prepared from norbornylene, and dithiocarbamates prepared from epoxides, where the alkyl groups of the dialkyldithiocarbamate can preferably have from 1 to 16 carbons. Examples of dialkyldithiocarbamates that may be used are disclosed in the following patents: U.S. Pat. Nos. 5,693,598; 4,876,375; 4,927,552; 4,957,643; 4,885,365; 5,789,357; 5,686,397; 5,902,776; 2,786,866; 2,710,872; 2,384,577; 2,897,152; 3,407,222; 3,867,359; and 4,758,362.

Examples of ashless dithiocarbamates are: Methylenebis (dibutyldithiocarbamate), Ethylenebis(dibutyldithiocarbamate), Isobutyl disulfide-2,2'-bis(dibutyldithiocarbamate), Dibutyl-N,N-dibutyl-(dithiocarbamyl)succinate, 2-hydroxypropyl dibutyldithiocarbamate, Butyl(dibutyldithiocarbamyl)acetate, and S-carbomethoxy-ethyl-N,N-dibutyl dithiocarbamate. The most desirable ashless dithiocarbamate is methylenebis(dibutyldithiocarbamate).

Zinc dialkyl dithiophosphates ("Zn DDPs") may also be used in lubricating oils in addition to the nanospherical components. Zn DDPs have good antiwear and antioxidant properties and have been used to pass cam wear tests, such as the Seq. IVA and TU3 Wear Test. Many patents address the manufacture and use of Zn DDPs including U.S. Pat. Nos. 4,904,401; 4,957,649; and 6,114,288. Non-limiting general Zn DDP types are primary, secondary and mixtures of primary and secondary Zn DDPs Likewise, organomolybdenum containing compounds used as friction modifiers may also exhibit antioxidant functionality. U.S. Pat. No. 6,797,677 describes a combination of organomolybdenum compound, alkylphenothizine and alkyldiphenylamines for use in finished lubricant formulations. Examples of suitable molybdenum containing friction modifiers are described below under friction modifiers.

The metal-containing nanoparticles described herein may be used with any or all of the foregoing antioxidants in any and all combinations and ratios. It is understood that various combinations of phenolic, aminic, sulfur containing and molybdenum containing additives may be optimized for the finished lubricant formulation based on bench or engine tests or modifications of the dispersant, VI improver, base oil, or any other additive.

Friction Modifier Components

A sulfur- and phosphorus-free organomolybdenum compound that may be used as an additional friction modifier may be prepared by reacting a sulfur- and phosphorus-free molybdenum source with an organic compound containing amino and/or alcohol groups. Examples of sulfur- and phosphorus-free molybdenum sources include molybdenum trioxide, ammonium molybdate, sodium molybdate and potassium molybdate. The amino groups may be monoamines, diamines, or polyamines. The alcohol groups may be mono-substituted alcohols, diols or bis-alcohols, or polyalcohols. As an example, the reaction of diamines with fatty oils produces a product containing both amino and alcohol groups that can react with the sulfur- and phosphorus-free molybdenum source.

Examples of sulfur- and phosphorus-free organomolybdenum compounds include the following:

(1) Compounds prepared by reacting certain basic nitrogen compounds with a molybdenum source as described in U.S. Pat. Nos. 4,259,195 and 4,261,843.

(2) Compounds prepared by reacting a hydrocarbyl substituted hydroxy alkylated amine with a molybdenum source as described in U.S. Pat. No. 4,164,473.

(3) Compounds prepared by reacting a phenol aldehyde condensation product, a mono-alkylated alkylene diamine, and a molybdenum source as described in U.S. Pat. No. 4,266,945.

(4) Compounds prepared by reacting a fatty oil, diethanolamine, and a molybdenum source as described in U.S. Pat. No. 4,889,647.

(5) Compounds prepared by reacting a fatty oil or acid with 2-(2-aminoethyl)aminoethanol, and a molybdenum source as described in U.S. Pat. No. 5,137,647.

(6) Compounds prepared by reacting a secondary amine with a molybdenum source as described in U.S. Pat. No. 4,692,256.

(7) Compounds prepared by reacting a diol, diamino, or amino-alcohol compound with a molybdenum source as described in U.S. Pat. No. 5,412,130.

(8) Compounds prepared by reacting a fatty oil, mono-alkylated alkylene diamine, and a molybdenum source as described in U.S. Pat. No. 6,509,303.

(9) Compounds prepared by reacting a fatty acid, mono-alkylated alkylene diamine, glycerides, and a molybdenum source as described in U.S. Pat. No. 6,528,463.

Molybdenum compounds prepared by reacting a fatty oil, diethanolamine, and a molybdenum source as described in U.S. Pat. No. 4,889,647 are sometimes illustrated with the following structure, where R is a fatty alkyl chain, although the exact chemical composition of these materials is not fully known and may in fact be multi-component mixtures of several organomolybdenum compounds.

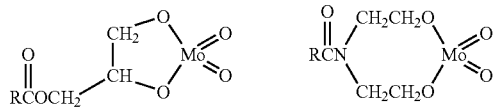

Sulfur-containing organomolybdenum compounds may be used and may be prepared by a variety of methods. One method involves reacting a sulfur and phosphorus-free molybdenum source with an amino group and one or more sulfur sources. Sulfur sources can include for example, but are not limited to, carbon disulfide, hydrogen sulfide, sodium sulfide and elemental sulfur. Alternatively, the sulfur-containing molybdenum compound may be prepared by reacting a sulfur-containing molybdenum source with an amino group or thiuram group and optionally a second sulfur source.

Examples of sulfur- and phosphorus-free molybdenum sources include molybdenum trioxide, ammonium molybdate, sodium molybdate, potassium molybdate, and molybdenum halides. The amino groups may be monoamines, diamines, or polyamines. As an example, the reaction of molybdenum trioxide with a secondary amine and carbon disulfide produces molybdenum dithiocarbamates. Alternatively, the reaction of $(NH_4)_2Mo_3S_{13}*n(H_2O)$ where n varies between 0 and 2, with a tetralkylthiuram disulfide, produces a trinuclear sulfur-containing molybdenum dithiocarbamate.

Examples of sulfur-containing organomolybdenum compounds appearing in patents and patent applications include the following:

(1) Compounds prepared by reacting molybdenum trioxide with a secondary amine and carbon disulfide as described in U.S. Pat. Nos. 3,509,051 and 3,356,702.

(2) Compounds prepared by reacting a sulfur-free molybdenum source with a secondary amine, carbon disulfide, and an additional sulfur source as described in U.S. Pat. No. 4,098,705.

(3) Compounds prepared by reacting a molybdenum halide with a secondary amine and carbon disulfide as described in U.S. Pat. No. 4,178,258.

(4) Compounds prepared by reacting a molybdenum source with a basic nitrogen compound and a sulfur source as described in U.S. Pat. Nos. 4,263,152, 4,265, 773, 4,272,387, 4,285,822, 4,369,119, and 4,395,343.

(5) Compounds prepared by reacting ammonium tetrathiomolybdate with a basic nitrogen compound as described in U.S. Pat. No. 4,283,295.

(6) Compounds prepared by reacting an olefin, sulfur, an amine and a molybdenum source as described in U.S. Pat. No. 4,362,633.

(7) Compounds prepared by reacting ammonium tetrathiomolybdate with a basic nitrogen compound and an organic sulfur source as described in U.S. Pat. No. 4,402, 840.

(8) Compounds prepared by reacting a phenolic compound, an amine and a molybdenum source with a sulfur source as described in U.S. Pat. No. 4,466,901.

(9) Compounds prepared by reacting a triglyceride, a basic nitrogen compound, a molybdenum source, and a sulfur source as described in U.S. Pat. No. 4,765,918.

(10) Compounds prepared by reacting alkali metal alkylthioxanthate salts with molybdenum halides as described in U.S. Pat. No. 4,966,719.

(11) Compounds prepared by reacting a tetralkylthiuram disulfide with molybdenum hexacarbonyl as described in U.S. Pat. No. 4,978,464.

(12) Compounds prepared by reacting an alkyl dixanthogen with molybdenum hexacarbonyl as described in U.S. Pat. No. 4,990,271.

(13) Compounds prepared by reacting alkali metal alkylxanthate salts with dimolybdenum tetra-acetate as described in U.S. Pat. No. 4,995,996.

(14) Compounds prepared by reacting $(NH_4)_2Mo_3S_{13}*2H_2O$ with an alkali metal dialkyldithiocarbamate or tetralkyl thiuram disulfide as described in U.S. Pat. No. 6,232,276.

(15) Compounds prepared by reacting an ester or acid with a diamine, a molybdenum source and carbon disulfide as described in U.S. Pat. No. 6,103,674.

(16) Compounds prepared by reacting an alkali metal dialkyldithiocarbamate with 3-chloropropionic acid, followed by molybdenum trioxide, as described in U.S. Pat. No. 6,117,826.

Molybdenum dithiocarbamates may be illustrated by the following structure,

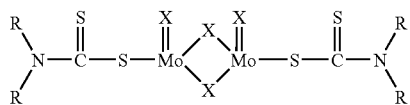

where R is an alkyl group containing 4 to 18 carbons or H, and X is O or S.

Glycerides may also be used alone or in combination with other friction modifiers. Suitable glycerides include glycerides of the formula:

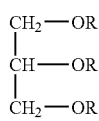

wherein each R is independently selected from the group consisting of H and C(O)R' where R' may be a saturated or an unsaturated alkyl group having from 3 to 23 carbon atoms. Examples of glycerides that may be used include glycerol monolaurate, glycerol monomyristate, glycerol monopalmitate, glycerol monostearate, and mono-glycerides derived from coconut acid, tallow acid, oleic acid, linoleic acid, and linolenic acids. Typical commercial monoglycerides contain substantial amounts of the corresponding diglycerides and triglycerides. These materials are not detrimental to the production of the molybdenum compounds, and may in fact be more active. Any ratio of mono- to di-glyceride may be used, however, it is preferred that from 30 to 70% of the available sites contain free hydroxyl groups (i.e., 30 to 70% of the total R groups of the glycerides represented by the above formula are hydrogen). A preferred glyceride is glycerol monooleate, which is generally a mixture of mono, di, and tri-glycerides derived from oleic acid, and glycerol.

Additional Additives

Rust inhibitors selected from the group consisting of non-ionic polyoxyalkylene polyols and esters thereof, polyoxyalkylene phenols, and anionic alkyl sulfonic acids may be used.

A small amount of a demulsifying component may be used. A suitable demulsifying component is described in EP 330,522. Such demulsifying component may be obtained by reacting an alkylene oxide with an adduct obtained by reacting a bis-epoxide with a polyhydric alcohol. The demulsifier should be used at a level not exceeding 0.1 mass % active ingredient. A treat rate of 0.001 to 0.05 mass % active ingredient is convenient.

Pour point depressants, otherwise known as lube oil flow improvers, lower the minimum temperature at which the fluid will flow or can be poured. Such additives are well known. Typical of those additives which improve the low temperature fluidity of the fluid are $C_8$ to $C_{18}$ dialkyl fumarate/vinyl acetate copolymers, polyalkylmethacrylates and the like.

Foam control can be provided by many compounds including an antifoamant of the polysiloxane type, for example, silicone oil or polydimethyl siloxane.

Seal swell agents, as described, for example, in U.S. Pat. Nos. 3,794,081 and 4,029,587, may also be used.

Viscosity modifiers (VM) function to impart high and low temperature operability to a lubricating oil. The VM used may have that sole function, or may be multifunctional, that is, the VM may also function as dispersants.

Suitable viscosity modifiers are polyisobutylene, copolymers of ethylene and propylene and higher alpha-olefins, polymethacrylates, polyalkylmethacrylates, methacrylate copolymers, copolymers of an unsaturated dicarboxylic acid and a vinyl compound, interpolymers of styrene and acrylic esters, and partially hydrogenated copolymers of styrene/isoprene, styrene/butadiene, and isoprene/butadiene, as well as the partially hydrogenated homopolymers of butadiene and isoprene/divinylbenzene.

Functionalized olefin copolymers that may be used include interpolymers of ethylene and propylene which are grafted with an active monomer such as maleic anhydride and then derivatized with an alcohol or amine. Other such copolymers are copolymers of ethylene and propylene which are grafted with nitrogen compounds.

Each of the foregoing additives, when used, is used at a functionally effective amount to impart the desired properties to the lubricant. Thus, for example, if an additive is a corrosion inhibitor, a functionally effective amount of this corrosion inhibitor would be an amount sufficient to impart the desired corrosion inhibition characteristics to the lubricant. Generally, the concentration of each of these additives, when used, ranges up to about 20% by weight based on the weight of the lubricating oil composition, and in one embodiment from about 0.001% to about 20% by weight, and in one embodiment about 0.01% to about 10% by weight based on the weight of the lubricating oil composition.

The metal-containing nanoparticles may be added directly to the lubricating oil composition. In one embodiment, however, the nanoparticles are diluted with a substantially inert, normally liquid organic diluent such as mineral oil, synthetic oil, naphtha, alkylated (e.g. $C_{10}$ to $C_{13}$ alkyl) benzene, toluene or xylene to form an additive concentrate. These concentrates usually contain from about 1% to about 100% by weight and in one embodiment about 10% to about 90% by weight of the nanospherical components.

Base Oils

Base oils suitable for use in formulating the compositions, additives and concentrates described herein may be selected from any of the synthetic or natural oils or mixtures thereof. The synthetic base oils include alkyl esters of dicarboxylic acids, polyglycols and alcohols, poly-alpha-olefins, including polybutenes, alkyl benzenes, organic esters of phosphoric acids, polysilicone oils, and alkylene oxide polymers, interpolymers, copolymers and derivatives thereof where the terminal hydroxyl groups have been modified by esterification, etherification, and the like. The synthetic oils may also include the gas to liquid synthetic oils.

Natural base oils include animal oils and vegetable oils (e.g., castor oil, lard oil), liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. The base oil typically has a viscosity of about 2.5 to about 15 cSt and preferably about 2.5 to about 11 cSt at 100° C.

Representative effective amounts of the metal-containing nanoparticles and additives, when used in crankcase lubricants, are listed in Table 1 below. All the values listed are stated as weight percent active ingredient.

TABLE 1

| Component | Wt. % (Broad) | Wt. % (Typical) |
|---|---|---|
| Dispersant | 0.5-5.0 | 1.0-2.5 |
| Antioxidant system | 0-5.0 | 0.01-3.0 |
| Metal Detergents | 0.1-15.0 | 0.2-8.0 |
| Corrosion Inhibitor | 0-5.0 | 0-2.0 |
| Metal dihydrocarbyl dithiophosphate | 0.1-6.0 | 0.1-4.0 |
| Metal-containing nanoparticles | 0.1-5.0 | 0.1-3.0 |
| Antifoaming agent | 0-5.0 | 0.001-0.15 |
| Friction Modifier | 0-5.0 | 0-2.0 |
| Supplemental antiwear agents | 0-1.0 | 0-0.8 |
| Pour point depressant | 0.015.0 | 0.01-1.5 |
| Viscosity modifier | 0.01-10.00 | 0.25-7.0 |
| Base oil | balance | balance |
| Total | 100 | 100 |

The following examples are given for the purpose of exemplifying aspects of the embodiments and are not intended to limit the embodiments in any way.

EXAMPLE 1

Production of $CeO_2$ Nanoparticles

The following procedure was used to produce cerium oxide nanoparticles having a particle size of less than 5 nanometers. Cerium acetate (1 gram, 0.00315 mols) was mixed with 7.5 mL of oleylamine (0.2279 mols) and 4.33 mL of oleic acid (0.13 mols) in a suitable vessel. The mixture was heated to 110° C. and held at that temperature for 10 minutes to provide a clear solution of cerium acetate without crystalline water in the solution. Next, the cerium acetate solution was irradiated with microwave irradiation for 10 to 15 minutes to produce a stable dispersion of cerium oxide in the amine and acid. The stabilized dispersion was washed 2-3 times with ethanol to remove any free amine or acid remaining in the dispersion. Finally, the stabilized cerium oxide product was dried overnight under a vacuum to provide the particles have a size of less than 5 nanometers. X-ray diffraction confirmed that nanoparticles of crystalline cerium oxide were produced. UV absorption of the product showed a peak at 300 nanometers which from extrapolation of the absorption edge indicated a band gap of 3.6 eV confirming that the nanoparticles have a diameter of less than 5 nanometers.

EXAMPLE 2

Production of $Mg_{0.3}Mn_{0.7}O$ Nanoalloy Particles
(Cubes+Spheres)

The following procedure was used to produce an alloy of magnesium and manganese oxide nanoparticles. Oleylamine (4.25 mL, 0.129 mols) and 1.36 mL of oleic acid (0.04 mols) was mixed in a suitable vessel that was stirred and heated in a hot oil bath to 120° C. and held at that temperature for 10 minutes. A mixture of magnesium acetate (0.14 grams) and manganese acetyl acetonate (0.34 grams) powder was added under vigorous stirring to the amine and acid to provide a clear solution. The solution was then microwaved for 15 minutes. After microwaving the solution, synthesized nanoparticles of magnesium/manganese oxide were flocculated with ethanol, centrifuged, and redispersed in toluene.

Figure 2:
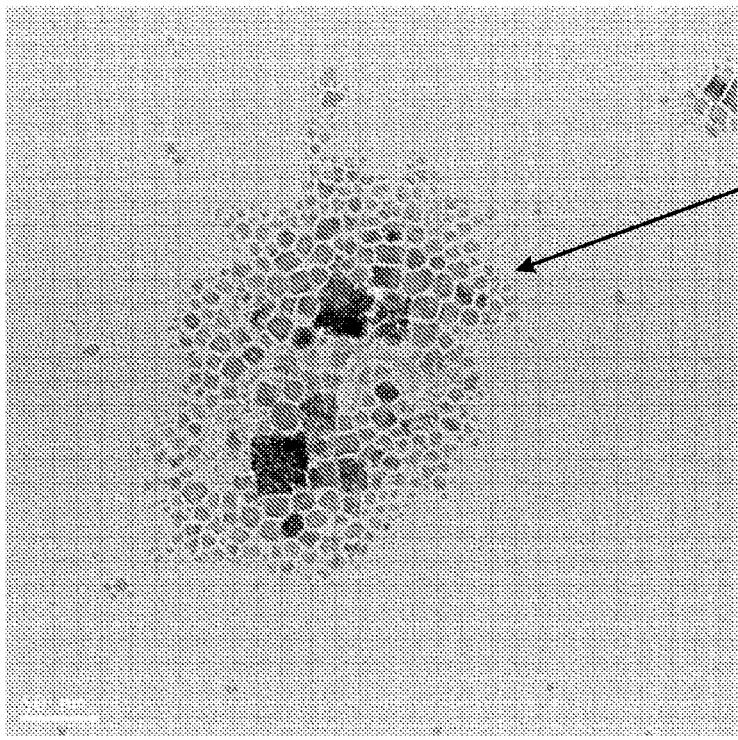
FIG. 2 is photomicrograph of the nanoalloy particles according to the first embodiment of the disclosure.

The $Mg_{0.3}Mn_{0.7}O$ nanoparticles made by the foregoing process had an x-ray diffraction pattern as shown in FIG. 1 that indicated that traces of manganese oxide were included in the $Mg_{0.3}Mn_{0.7}O$ alloy. The photomicrograph of the nanoparticles 10 (FIG. 2) showed that the nanoparticles had cube-like structures similar to manganese oxide particles.

EXAMPLE 3

Production of $CoFe_2O_4$ Nanoalloy Particles
(Spheres)

The following procedure was used to produce an alloy of cobalt and iron oxide nanoparticles having a particle size of less than 5 nanometers. Oleylamine (3.75 mL, 0.114 mols) and 3.6 mL of oleic acid (0.11 mols) was mixed in a suitable vessel that was stirred and heated in a hot oil bath to 120° C. and held at that temperature for 15 minutes. A mixture of iron acetyl acetonate (0.45 grams) and cobalt acetyl acetonate (0.16 grams) powder was added under vigorous stirring to the amine and acid to provide a clear solution. The solution was then microwaved for 10 minutes. After the solution was cooled, 300 µL hydrogen tetrachloroaurate (30 wt. % solution in hydrochloric acid) were injected into the alloyed particle solution under vigorous stirring for 10 minutes. The synthesized nanoparticles of cobalt/iron oxide were flocculated with ethanol, centrifuged, and redispersed in toluene.

Figure 3:
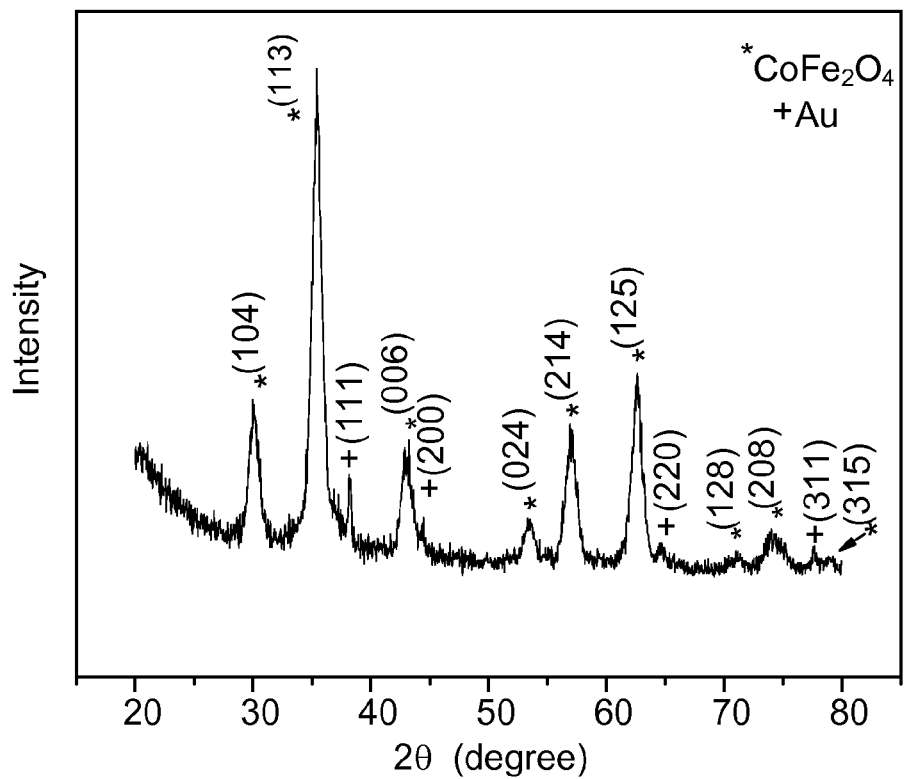
FIG. 3 is an x-ray diffraction pattern of nanoalloy particles according to a second embodiment of the disclosure.
Figure 4:
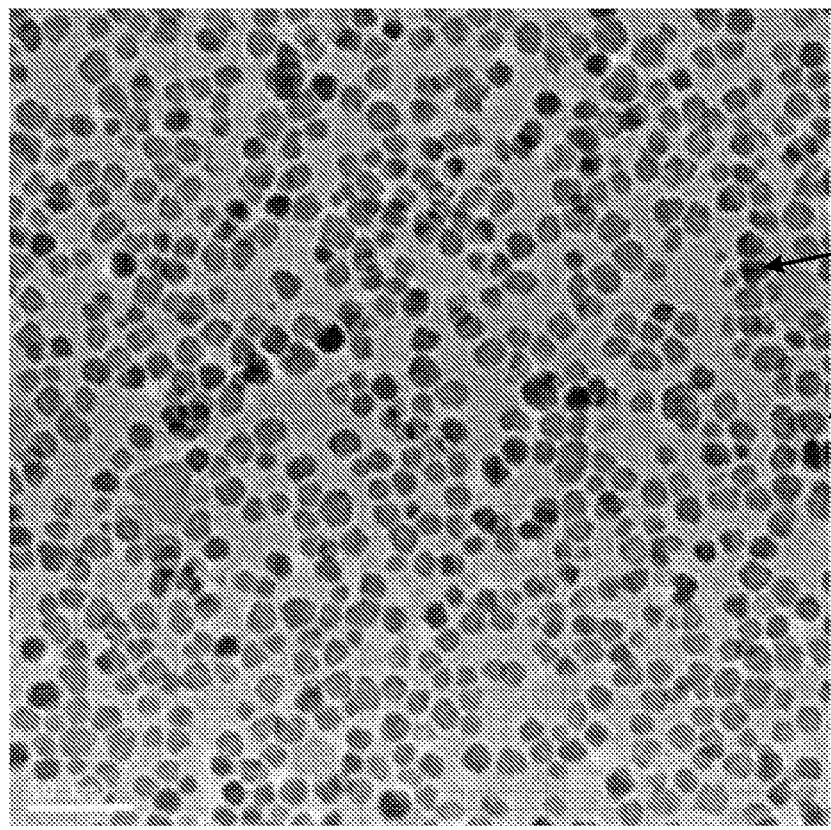
FIG. 4 is photomicrograph of the nanoalloy particles according to the second embodiment of the disclosure.

The $CoFe_2O_4$ nanoparticles made by the foregoing process had an x-ray diffraction pattern as shown in FIG. 3 that included metallic gold particles with no evidence of mixed oxides. The photomicrograph of the nanoparticles 12 (FIG. 4) showed monodispersed spherical particles of $CoFe_2O_4$ doped with gold particles 14.

EXAMPLE 4

Production of CuZnS Nanoalloy Particles
(Rods+Spheres)

The following procedure was used to produce an alloy of copper and zinc sulfide nanoparticles having a particle size of less than 5 nanometers. A mixture of copper xanthate (0.17 grams) and zinc xanthate (0.17 grams) was added to 3 grams of hexadecylamine (0.012 mols) that was preheated in a hot oil bath to 80-110° C. and held at that temperature for 15 minutes to form a clear solution. The solution was then microwaved for 2 minutes with 30 second cycles (10 seconds off and 20 seconds on). After microwaving the solution, synthesized nanoparticles of copper/zinc sulfide were flocculated with methanol, centrifuged, and redispersed in toluene or dichloromethane.

Figure 5:
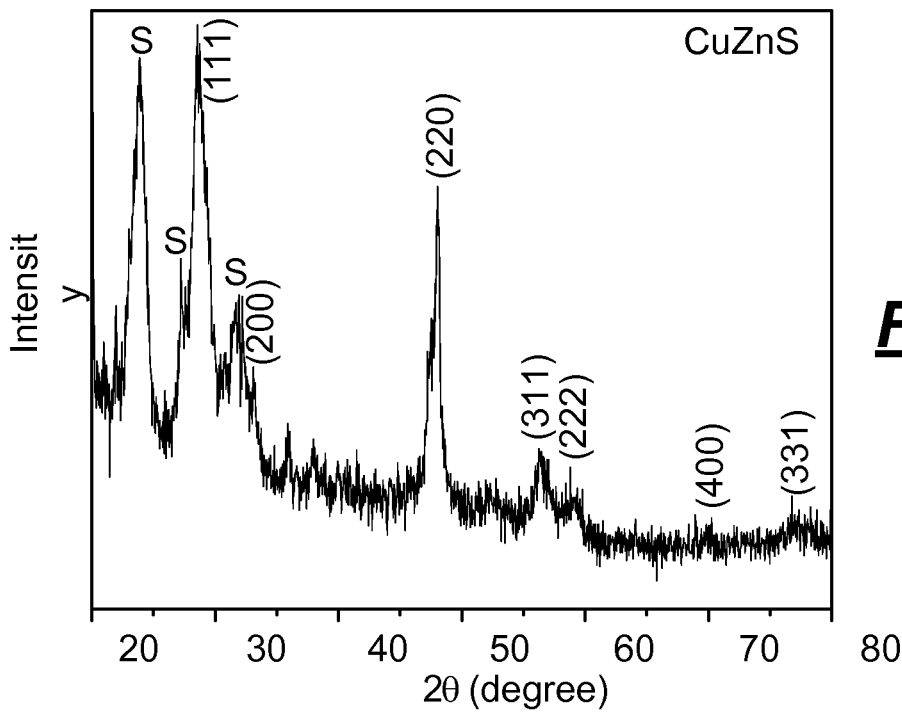
FIG. 5 is an x-ray diffraction pattern of nanoalloy particles according to a third embodiment of the disclosure.
Figure 6:
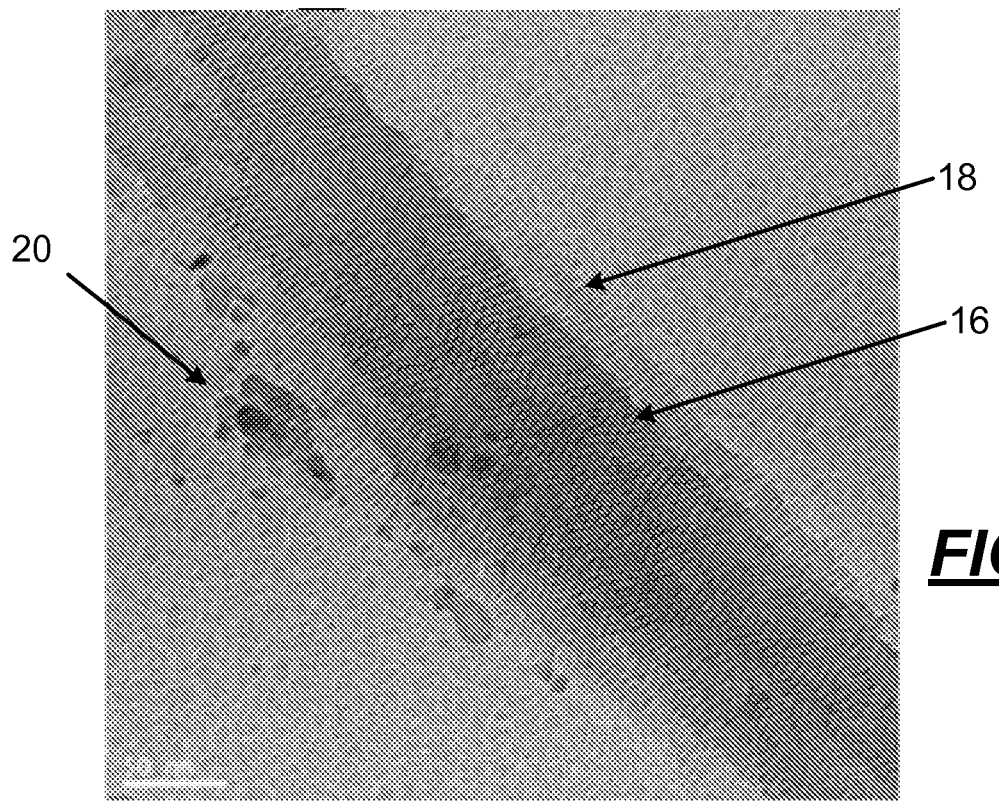
FIG. 6 is photomicrograph of the nanoalloy particles according to the third embodiment of the disclosure.

The CuS and ZnS nanoparticles made by the foregoing process had an x-ray diffraction pattern as shown in FIG. 5 that included sulfur atoms. The photomicrograph of the nanoparticles 16 (FIG. 6) showed the formation of ordered aligned rod-like structures arranged in long belts 18. There were also randomly orders small spherical particles 20 next to the belts.

EXAMPLE 5

Boundary Friction Coefficients of Cerium Oxide Nanoparticles

In the following example, the boundary friction coefficients were determined for a Group II base oil and a Group II base oil containing various friction modifiers or nanoparticles. The boundary friction coefficients were measured in a high frequency reciprocating test rig (HFRR) at a temperature of 130° C. The boundary friction coefficients determined on the HFRR are shown in Table 2.

TABLE 2

| Sample No. | | Boundary Friction Coefficient at 130° C. | % Reduction in Friction versus Group II Base Oil |
|---|---|---|---|
| 1 | Group II Base Oil | 0.154 +/- 0.004 | 0% |
| 2 | Group II Base Oil + 1 wt. % glycerol monooleate | 0.096 +/- 0.010 | 37.7% |
| 3 | Group II Base Oil + 1 wt. % ZnS spheres | 0.105 +/- 0.009 | 31.8% |
| 4 | Group II Base Oil + 1 wt. % ZnS rods | 0.106 +/- 0.003 | 31.2% |
| 5 | Group II Base Oil + 1 wt. % $CeO_2$ spheres | 0.103 +/- 0.001 | 33.1% |
| 6 | Group II Base Oil + 1 wt. % $CeO_2$ plates | 0.089 +/- 0.009 | 42.2% |
| 7 | Group II Base Oil + 0.1 wt. % glycerol monooleate | 0.122 +/- 0.006 | 20.8% |
| 8 | Group II Base Oil + 0.1 wt. % ZnS spheres | 0.138 +/- 0.001 | 10.4% |
| 9 | Group II Base Oil + 0.1 wt. % ZnS rods | 0.146 +/- 0.011 | 5.2% |
| 10 | Group II Base Oil + 0.1 wt. % $CeO_2$ spheres | 0.099 +/- 0.002 | 35.7% |
| 11 | Group II Base Oil + 2.0 wt. % 1:2 mixture of $CeO_2$:ZnS | 0.112 +/- 0.003 | 27.3% |
| 12 | Group II Base Oil + 2.0 wt. % 1:1 mixture of $CeO_2$:ZnS | 0.108 +/- 0.002 | 29.9% |
| 13 | Group II Base Oil + 2.0 wt. % 4:1 mixture of $CeO_2$:ZnS | 0.092 +/- 0.003 | 40.3% |

As shown in Table 2, the cerium oxide particles at 1 wt. % in the base oil (Samples 5-6) reduce boundary friction coefficients at least as well as glycerol monooleate and ZnS nanoparticles (Samples 2-4). At lower concentrations, the cerium oxide nanoparticles (Sample 10) are substantially more effective at reducing boundary friction coefficients than glycerol monooleate and ZnS nanoparticles (Samples 7-9). Samples 11-13 show the effects on boundary friction coefficients for mixtures of nanoparticles. The results of Samples 11-13 indicate that as the concentration of the cerium oxide nanoparticles is increased in the mixtures, the boundary friction coefficients decrease.

EXAMPLE 6

Boundary Friction Coefficients of Cerium Oxide Nanoparticles in a PCMO

The effectiveness of a reduction in the boundary friction coefficients for a fully formulated passenger car motor oil (PCMO) containing dispersants, detergents, antioxidants, viscosity modifiers, pour point depressants, and antifoam agents according to Table 1 is provided in the following Table. The fully formulated PCMO did not contain additional metal free or metal-containing friction modifiers other than as indicated in the following table.

TABLE 3

| Sample No. | | Boundary Friction Coefficient at 130° C. | % Reduction in Friction versus Group II Base Oil |
|---|---|---|---|
| 1 | PCMO | 0.126 +/- 0.002 | 0% |
| 2 | PCMO + 0.25 wt. % glycerol monooleate | 0.078 +/- 0.002 | 38.1% |
| 3 | PCMO + 0.1 wt. % ZnS spheres | 0.116 +/- 0.004 | 7.9% |
| 4 | PCMO + 0.1 wt. % ZnS rods | 0.104 +/- 0.005 | 17.5% |

TABLE 3-continued

| Sample No. | | Boundary Friction Coefficient at 130° C. | % Reduction in Friction versus Group II Base Oil |
|---|---|---|---|
| 5 | PCMO + 0.1 wt. % $CeO_2$ spheres | 0.086 +/- 0.010 | 31.7% |

As shown by the foregoing results, the cerium oxide nanoparticles are statistically as effective at reducing boundary friction at 0.1 wt. % as glycerol monooleate at 0.25 wt. %. Further the results show that 0.1 wt. % cerium oxide nanoparticles are more effective for reducing boundary friction coefficients than ZnS nanoparticles at the same concentration in the PCMO.

It is expected that formulations containing from about 0.1 to about 5.0 wt. % or more cerium oxide nanoparticles will enable a reduction in the amount of conventional antiwear agents, such as sulfur and/or phosphorus containing compounds, needed thereby improving the performance of pollution control equipment on vehicles while achieving a similar or improved friction coefficient performance or benefit and little or no adverse effect on the corrosiveness of the oil.

At numerous places throughout this specification has been made to a number of U.S. Patents. All such cited documents are expressly incorporated in full into this disclosure as if fully set forth herein.

The foregoing embodiments are susceptible to considerable variation in its practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

What is claimed is:

1. A method for reducing a friction coefficient adjacent a lubricated surface of a vehicle, comprising providing self-dispersing metal-containing nanoparticles, wherein said nanoparticles are dispersed without the use of an additional dispersing agent, the nanoparticles being dispersed in a lubricant composition containing a base oil of lubricating viscosity, wherein the lubricant composition comprises from about 0.1 to about 5 wt.% of the self-dispersing nanoparticles based on a total weight of the lubricant composition, and providing the lubricant composition containing the self-dispersing metal-containing nanoparticles selected from the group consisting of oxide and sulfide nanoparticles to a component of a vehicle selected from the group consisting of an engine crankcase and an engine drive train, and operating the vehicle wherein the self-dispersing nanoparticles are represented by the formula $(A_a)_m(B_b)_nX_x$, wherein each of A, B is selected from a metal, X is selected from the group consisting of oxygen and sulfur, subscripts a, b, and x represent compositional stoichiometry, and each of m and n is greater than or equal to zero with the proviso that at least one of m and n is greater than zero, and wherein the self-dispersing nanoparticles are derived from one or more metal organic compounds in the presence of a fatty amine and fatty acid in the substantial absence of water and the nanoparticles, as made, are self-dispersing without the need for a separate coating step and have an average particles size ranging from about 1 to about 10 nanometers.

2. The method of claim 1, wherein the lubricated surface comprises an engine drive train.

3. The method of claim 1, wherein the lubricated surface comprises an internal surface or component of an internal combustion engine.

4. The method of claim 1, wherein the lubricated surface comprises an internal surface or component of a compression ignition engine.

5. The method of claim 1, wherein the amount of metal-containing nanoparticles in the lubricant composition ranges from about 0.1 to about 2 percent by weight.

6. The method of claim 1, wherein each of A and B is selected from the group consisting of metals from Groups 1A, 2A, 3A, 4A, 5A, and 6A of the Periodic Table, transition metals, lanthanides, actinides, and mixtures thereof.

7. The method of claim 1, wherein the metal-containing nanoparticles comprise cerium oxide nanoparticles having a spherical shape.

8. A method of reducing a friction coefficient of an engine lubricant composition during operation of an engine containing the lubricant composition, comprising providing a crankcase of the engine with a lubricant composition comprising a base oil of lubricating viscosity and self-dispersing metal-containing nanoparticles, wherein said nanoparticles are dispersed without the use of an additional dispersing agent, the nanoparticles being provided in an amount ranging from about 0.1 to about 5 wt.% based on a total weight of the lubricant composition, said amount being sufficient to reduce the friction coefficient to below a friction coefficient of a lubricant composition devoid of the self-dispersing metal-containing nanoparticles, and operating the engine, wherein the nanoparticles have an average particle size ranging from about 1 to about 10 nanometers, and wherein the nanoparticles are selected from the group consisting of oxide and sulfide nanoparticles represented by the formula $(A_a)_m(B_b)_nX_x$, wherein each of A, B is selected from a metal, X is selected from the group consisting of oxygen and sulfur, subscripts a, b, and x represent compositional stoichiometry, and each of m and n is greater than or equal to zero with the proviso that at least one of m and n is greater than zero, and wherein the self-dispersing nanoparticles are derived from one or more metal organic compounds in the presence of a fatty amine and fatty acid in the substantial absence of water and the nanoparticles are self-dispersing, as made, without the need for a separate coating step.

9. The method of claim 8, wherein the engine comprises a heavy duty diesel engine.

10. The method of claim 8, wherein the amount of metal-containing nanoparticles in the lubricant composition ranges from about 0.1 to about 2 percent by weight.

11. The method of claim 9, wherein each of A and B is selected from the group consisting of metals from Groups 1A, 2A, 3A, 4A, 5A, and 6A of the Periodic Table, transition metals, lanthanides, actinides, and mixtures thereof.

12. A method of for reducing wear between moving parts of a vehicle using a lubricating oil, the method comprising providing a lubricant composition containing a base oil, and an oil additive package including a wear reducing agent to a vehicle component selected from the group consisting of an engine crankcase and an vehicle drive train and operating the vehicle, wherein the wear reducing agent comprises self-dispersing metal-containing nanoparticles, wherein said nanoparticles are dispersed without the use of an additional dispersing agent, the nanoparticles being selected from the group consisting of oxide nanoparticles and sulfide nanoparticles represented by the formula $(A_a)_m(B_b)_nX_x$, wherein each of A, B is selected from a metal, X is selected from the group consisting of oxygen and sulfur, subscripts a, b, and x represent compositional stoichiometry, and each of m and n is greater than or equal to zero with the proviso that at least one of m and n is greater than zero, wherein the self-dispersing nanoparticles are derived from one or more metal organic compounds in the presence of a fatty amine and fatty acid in the substantial absence of water and the nanoparticles are self-dispersing, as made, without the need for a separate coating step, and wherein the amount of nanoparticles in the lubricant composition ranges up to about 5 percent by weight of the total lubricant composition.

13. The method of claim 12, wherein the moving parts comprise moving parts of an engine.

14. The method of claim 13, wherein the engine is selected from the group consisting of a compression ignition engine and a spark ignition engine.

15. The method of claim 13, wherein the engine includes an internal combustion engine having a crankcase and wherein the lubricating oil comprises a crankcase oil present in the crankcase of the engine.

16. The method of claim 12, wherein the lubricating oil comprises a drive train lubricant present in a drive train of a vehicle containing the engine.

17. The method of claim 12, wherein the wear reducing agent is present in the lubricant composition in an amount ranging from about 0.1 to about 5 percent by weight.

18. The method of claim 12, wherein the wear reducing agent has an average particle size ranging from about 1 to about 10 nanometers.

19. A lubricant composition for a vehicle crankcase or a vehicle drive train comprising:
a base oil of lubricating viscosity; and
a boundary friction reducing amount of self-dispersing metal-containing nanoparticles, wherein said nanoparticles are dispersed without the use of an additional dispersing agent, the nanoparticles being dispersed in the base oil, said amount ranging from about 0.1 to about 5 wt.% based on a total weight of the lubricant composition, wherein the nanoparticles have an average particles size ranging from about 1 to about 10 nanometers and are represented by the formula $(A_a)_m(B_b)_n X_x$, wherein each of A, B is selected from a metal, X is selected from the group consisting of oxygen and sulfur, subscripts a, b, and x represent compositional stoichiometry, and each of m and n is greater than or equal to zero with the proviso that at least one of m and n is greater than zero and x is greater than zero, wherein the self-dispersing nanoparticles are derived from one or more metal organic compounds in the presence of a fatty amine and fatty acid in the substantial absence of water and the nanoparticles are self-dispersing, as made, without the need for a separate coating step, and wherein the metal-containing nanoparticles are effective to reduce a boundary friction coefficient between lubricated metal surfaces to below a boundary friction coefficient between the lubricated metal surfaces of a lubricant composition devoid of the metal-containing nanoparticles.

20. The lubricant composition of claim 19, wherein the amount of metal-containing nanoparticles dispersed in the base oil ranges from about 0.1 to about 2 percent by weight.

21. The lubricant composition of claim 19, wherein the metal-containing nanoparticles comprises cerium-oxide nanoparticles having a spherical shape.

* * * * *